United States Patent
Gelman et al.

(10) Patent No.: US 10,540,758 B2
(45) Date of Patent: Jan. 21, 2020

(54) IMAGE FEATURE ALIGNMENT

(71) Applicant: SCHLUMBERGER TECHNOLOGY CORPORATION, Sugar Land, TX (US)

(72) Inventors: Andriy Gelman, Cambridge, MA (US); Arnaud Jarrot, Cambridge, MA (US); Robert Laronga, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/526,770

(22) PCT Filed: Nov. 13, 2015

(86) PCT No.: PCT/US2015/060641
§ 371 (c)(1),
(2) Date: May 15, 2017

(87) PCT Pub. No.: WO2016/077731
PCT Pub. Date: May 19, 2016

(65) Prior Publication Data
US 2017/0337675 A1    Nov. 23, 2017

Related U.S. Application Data

(60) Provisional application No. 62/079,967, filed on Nov. 14, 2014.

(51) Int. Cl.
*G06T 7/00* (2017.01)
*G06T 7/90* (2017.01)
*G01V 11/00* (2006.01)

(52) U.S. Cl.
CPC .......... *G06T 7/0004* (2013.01); *G01V 11/002* (2013.01); *G06T 7/90* (2017.01); *G06T 2207/30161* (2013.01)

(58) Field of Classification Search
CPC .................................................. G06T 7/0004
See application file for complete search history.

(56) References Cited

U.S. PATENT DOCUMENTS 5,299,128 A    3/1994    Antoine et al.
6,125,203 A    9/2000    Keskes et al.
(Continued)

FOREIGN PATENT DOCUMENTS

CN    1707289 A    12/2005
CN    102124320 A    7/2011
(Continued)

OTHER PUBLICATIONS

Astolfi, A. "Optimization", OFSR, Dec. 2013, 80 pages.
(Continued)

*Primary Examiner* — John E Breene
*Assistant Examiner* — Jeffrey C Morgan

(57) ABSTRACT

Image feature alignment is provided. In some implementations, a computer-readable tangible medium includes instructions that direct a processor to access a reference feature point associated with a high contrast region in a first sub-image that is associated with a first section of a borehole. Instructions are also present that direct the processor to identify several candidate feature points in a second sub-image associated with a second section of the borehole adjacent to the first section of the borehole, with each of the candidate feature points being believed to possibly be associated with the high contrast region. Additional instructions are present that direct the processor to prune the candidate feature points using global solution pruning to arrive at a matching candidate feature point in the second sub-image.

20 Claims, 8 Drawing Sheets

(56) References Cited

U.S. PATENT DOCUMENTS

| | | | |
|---|---|---|---|
| 6,175,644 B1 * | 1/2001 | Scola | G01N 21/8851 |
| | | | 117/201 |
| 8,725,477 B2 | 5/2014 | Zhang et al. | |
| 2006/0031017 A1 | 2/2006 | Mathieu et al. | |
| 2007/0024285 A1 | 2/2007 | Wang et al. | |
| 2009/0309602 A1 | 12/2009 | Wang | |

FOREIGN PATENT DOCUMENTS

| | | |
|---|---|---|
| CN | 203669861 U | 6/2014 |
| WO | WO2010014826 A3 | 2/2010 |

OTHER PUBLICATIONS

Chen, et al., "Fast Block Matching Algorithm Based on the Winner-Update Strategy", IEEE Transactions on Image Processing, vol. 10, Aug. 2001, pp. 1212-1122.

Hansen, C., "Regularization Tools: A Matlab Package for Analysis and Solution of Discrete Ill-Posed Problems", Numerical Algorithms 6 (1994) pp. 1-35.

Rabiner, L.R., "A Tutorial on Hidden Markov Models and Selected Applications in Speech Recognition", Proceedings of the IEE vol. 77, Feb. 1989, 257-286.

Zhang, et al, "Structure- and Texture-Based Fullbore Image Reconstruction", Match Geosci (2017) vol. 19, pp. 195-215.

\* cited by examiner

IMAGE FEATURE ALIGNMENT

RELATED APPLICATIONS

This application claims the benefit of U.S. Provisional Application having Ser. No. 62/079,967, filed on Nov. 14, 2014 and which is incorporated by reference herein in its entirety.

BACKGROUND

Wireline and other downhole imaging tools can be used to construct sub-images of a borehole. For example, a wireline tool can often deploy multiple pads at different locations and azimuthal orientations relative to a center of the wireline tool. These pads can include sensors capable of sampling various formation properties, including resistivity, along a slice of the borehole adjacent to each pad. A complete image of the entire borehole can then be created by adding these slices together and aligning them, though this can often be quite difficult.

For example, measurements in the various sub-images can be plotted as a function of measured depth in the borehole. However, sometimes the accurate depths of these measurements, as well as other quantities, may not be accurately known. Thus the features displayed in individual sub-images can appear misaligned when the sub-images are viewed side by side.

As a result, an interpretations engineer is often employed to manually piece the sub-images together by moving, compressing, and/or stretching different parts of the sub-images to align features in the sub-images and arrive at a complete, aligned borehole image. Manual post-processing such as this can be both time consuming and expensive. For example, for a one thousand foot borehole, an interpretations engineer may take twelve hours or more to create the complete, aligned borehole image.

SUMMARY

Image feature alignment is provided. In some implementations, a method includes: obtaining a first sub-image corresponding to a first section of a borehole; obtaining a second sub-image corresponding to a second section of the borehole, wherein the first section of the borehole is adjacent to the second section of the borehole; creating, using a processing system, a global template by estimating information in one or more gaps where information is missing between the first sub-image and second sub-image; locating, using the processing system, one or more reference feature points at various depths in the first sub-image; locating, using the processing system, for each of the one or more reference feature points in the first sub-image a set of associated candidate feature points in the second sub image using local feature matching; matching, using the processing system, each of the one or more reference feature points in the first sub-image to a corresponding matching candidate feature point chosen from the set of associated candidate feature points in the second sub-image using global solution pruning; and based on the matching, aligning, using the processing system, the first sub-image and the second sub-image to create an image of the borehole.

In accordance with some implementations, a method includes: identifying, using a processing system, a first reference feature point and a second reference feature point in a first sub-image associated with a first section of a borehole, wherein the first reference feature point and the second reference feature point are associated with corresponding high contrast regions in the first sub-image; locating, using the processing system, a first set of candidate feature points and a second set of candidate feature points in a second sub-image associated with a second section of the borehole adjacent to the first section of the borehole, wherein the first set of candidate feature points is associated with the first reference feature point and the second set of candidate feature points is associated with the second reference feature point; choosing, using the processing system, a first matching candidate feature point from the first set of candidate feature points and a second matching candidate feature point from the second set of candidate feature points; and based on the chosen first matching candidate feature point and the second matching candidate feature point, aligning, using the processing system, the first sub-image and the second sub-image to create an image of the borehole.

In accordance with some implementations, a method includes:

accessing, using a processing system, a reference feature point in a first sub-image associated with a first section of a borehole, wherein the reference feature point is associated with a high contrast region in the first sub-image; identifying, using the processing system, two or more candidate feature points in a second sub-image associated with a second section of the borehole adjacent to the first section of the borehole, wherein each of the two or more candidate feature points are possibly associated with the high contrast region; pruning, using the processing system, the one or more candidate feature points using global solution pruning to arrive at a matching candidate feature point in the second sub-image; and based on the arrived-at matching candidate feature point, aligning, using the processing system, the first sub-image and the second sub-image to create an image of the borehole In accordance with some implementations, a computer-readable tangible medium includes instructions that direct a processor to access a first sub-image associated with a first section of a borehole and a second sub-image associated with a second, adjacent section of the borehole. Instructions are also present that direct the processor to create a global template by estimating information missing in gaps between the first sub-image and second sub-image. Further instructions are present that direct the processor to locate several reference feature points at various depths in the first sub-image, and locate sets of associated candidate feature points in the second sub image using local feature matching. Additional instructions are present that direct the processor to match each reference feature point in the first sub-image to a corresponding matching candidate feature point chosen from the set of associated candidate feature points in the second sub-image using global solution pruning.

In another possible implementation, a computer-readable tangible medium includes instructions that direct a processor to identify a first reference feature point and a second reference feature point corresponding to high contrast regions in a first sub-image associated with a first section of a borehole. Instructions are also present that direct the processor to locate a first set of candidate feature points and a second set of candidate feature points in a second sub-image associated with a second section of the borehole adjacent to the first section of the borehole. The first set of candidate feature points is associated with the first reference feature point and the second set of candidate feature points is associated with the second reference feature point. Additional instructions are present that direct the processor to choose a first matching candidate feature point from the first set of candidate feature points and a second matching candidate feature point from the second set of candidate feature points.

In yet another possible implementation, a computer-readable tangible medium includes instructions that direct a processor to access a reference feature point associated with a high contrast region in a first sub-image that is associated with a first section of a borehole. Instructions are also present that direct the processor to identify several candidate feature points in a second sub-image associated with a second section of the borehole adjacent to the first section of the borehole, with each of the candidate feature points being believed to possibly be associated with the high contrast region. Additional instructions are present that direct the processor to prune the candidate feature points using global solution pruning to arrive at a matching candidate feature point in the second sub-image.

This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Additionally, some examples discussed herein involve technologies associated with the oilfield services industry. It will be understood however that the techniques of image feature alignment may also be useful in a wide range of other industries outside of the oilfield services sector, including for example, mining, geological surveying, etc.

As described herein, various techniques and technologies associated with image feature alignment can be used to automate the process of piecing together and aligning two or more borehole sub-images into a unified borehole image. In some implementations, such techniques can work with borehole sub-images taken from boreholes having both vertical and/or horizontal orientations.

Example Wellsite

Figure 1:
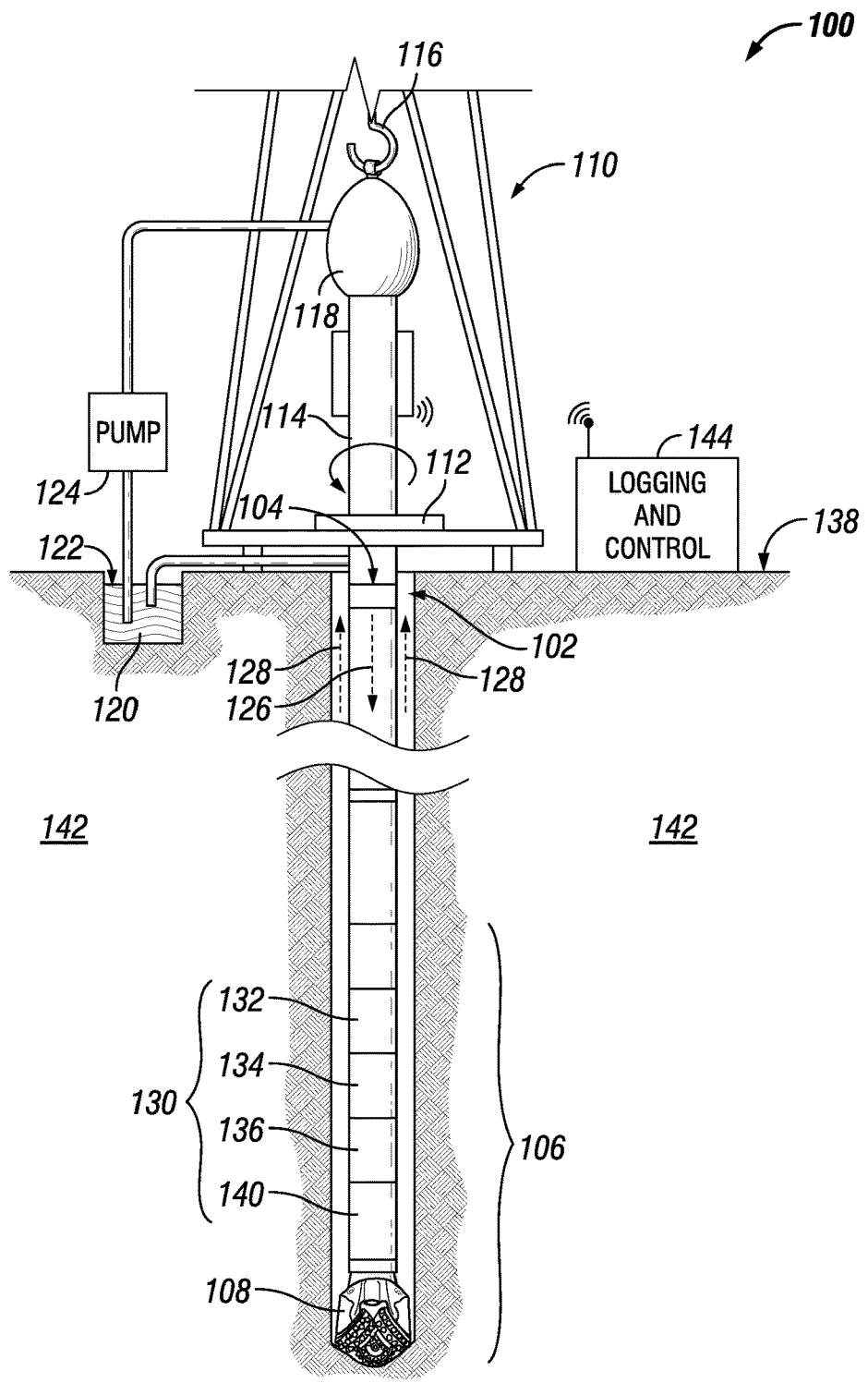
FIG. 1 illustrates an example wellsite in which embodiments of image feature alignment can be employed.

FIG. 1 illustrates a wellsite 100 in which embodiments of image feature alignment can be employed. Wellsite 100 can be onshore or offshore. In this example system, a borehole 102 is formed in a subsurface formation 142 by rotary drilling in a manner that is well known. Embodiments of image feature alignment can also be employed in association with wellsites where directional drilling is being conducted.

A drill string 104 can be suspended within borehole 102 and have a bottom hole assembly 106 including a drill bit 108 at its lower end. The surface system can include a platform and derrick assembly 110 positioned over the borehole 102. The assembly 110 can include a rotary table 112, kelly 114, hook 116 and rotary swivel 118. The drill string 104 can be rotated by the rotary table 112, energized by an actuator not shown, which engages kelly 114 at an upper end of drill string 104. Drill string 104 can be suspended from hook 116, attached to a traveling block (also not shown), through kelly 114 and a rotary swivel 118 which can permit rotation of drill string 104 relative to hook 116. As is well known, a top drive system can also be used.

In the example of this embodiment, the surface system can further include drilling fluid or mud 120 stored in a pit 122 formed at wellsite 100. A pump 124 can deliver drilling fluid 120 to an interior of drill string 104 via a port in swivel 118, causing drilling fluid 120 to flow downwardly through drill string 104 as indicated by directional arrow 126. Drilling fluid 120 can exit drill string 104 via ports in drill bit 108, and circulate upwardly through the annulus region between the outside of drill string 104 and wall of the borehole 102, as indicated by directional arrows 128. In this well-known manner, drilling fluid 120 can lubricate drill bit 108 and carry formation cuttings up to the surface as drilling fluid 120 is returned to pit 122 for recirculation.

Bottom hole assembly 106 of the illustrated embodiment can include drill bit 108 as well as a variety of equipment 130, including a logging-while-drilling (LWD) module 132, a measuring-while-drilling (MWD) module 134, a roto-steerable system and motor, various other tools, etc.

In some implementations, LWD module 132 can be housed in a special type of drill collar, as is known in the art, and can include one or more of a plurality of known types of logging tools (e.g., a nuclear magnetic resonance (NMR) system), a directional resistivity system, and/or a sonic logging system, etc). It will also be understood that more than one LWD and/or MWD module can be employed (e.g. as represented at position 136). (References, throughout, to a module at position 132 can also mean a module at position 136 as well). LWD module 132 can include capabilities for measuring, processing, and storing information, as well as for communicating with surface equipment.

MWD module 134 can also be housed in a special type of drill collar, as is known in the art, and include one or more devices for measuring characteristics of the well environment, such as characteristics of the drill string and drill bit. MWD module 134 can further include an apparatus (not shown) for generating electrical power to the downhole system. This may include a mud turbine generator powered by the flow of drilling fluid 120, it being understood that other power and/or battery systems may be employed. MWD module 134 can include one or more of a variety of measuring devices known in the art including, for example, a weight-on-bit measuring device, a torque measuring device, a vibration measuring device, a shock measuring device, a stick slip measuring device, a direction measuring device, and an inclination measuring device.

Various systems and methods can be used to transmit information (data and/or commands) from equipment 130 to a surface 138 of the wellsite 100. In some implementations, information can be received by one or more sensors 140. The sensors 140 can be located in a variety of locations and can be chosen from any sensing and/or detecting technology known in the art, including those capable of measuring various types of radiation, electric or magnetic fields, including electrodes (such as stakes), magnetometers, coils, etc.

In some implementations, information from equipment 130, including LWD data and/or MWD data, can be utilized for a variety of purposes including steering drill bit 108 and any tools associated therewith, characterizing a formation 142 surrounding borehole 102, characterizing fluids within borehole 102, etc. For example, information from equipment 130 can be used to create one or more sub-images of various portions of borehole 102.

In some implementations a logging and control system 144 can be present. Logging and control system 144 can receive and process a variety of information from a variety of sources, including equipment 130. Logging and control system 144 can also control a variety of equipment, such as equipment 130 and drill bit 108.

Logging and control system 144 can also be used with a wide variety of oilfield applications, including logging while drilling, artificial lift, measuring while drilling, wireline, etc. Also, logging and control system 144 can be located at surface 138, below surface 138, proximate to borehole 102, remote from borehole 102, or any combination thereof.

For example, in one possible implementation, information received by equipment 130 and/or sensors 140 can be processed by logging and control system 144 at one or more locations, including any configuration known in the art, such as in one or more handheld devices proximate and/or remote from the wellsite 100, at a computer located at a remote command center, etc. In one aspect, logging and control system 144 can be used to create sub-images of borehole 102 from information received from, for example equipment 130 and/or from various other tools, including wireline tools. In one possible implementation, logging and control system 144 can also perform various aspects of image feature alignment, as described herein, to create a unified borehole image from the sub-images of borehole 102.

Example Computing Device

Figure 2A:
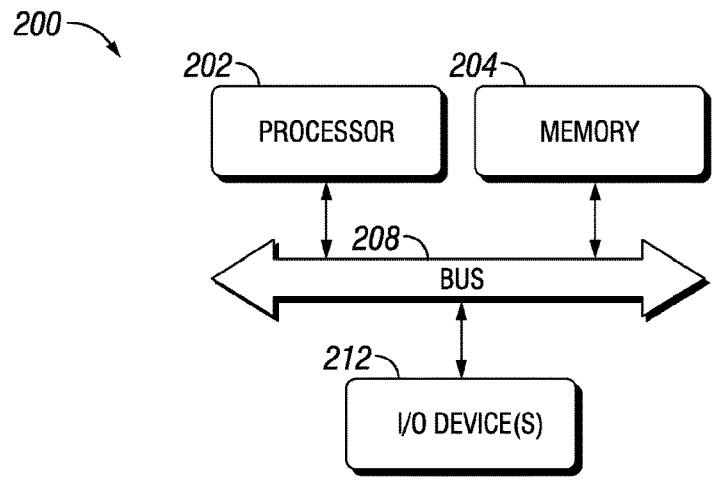
FIGS. 2A and 2B illustrate an example computing device that can be used in accordance with various implementations of image feature alignment.
Figure 2B:
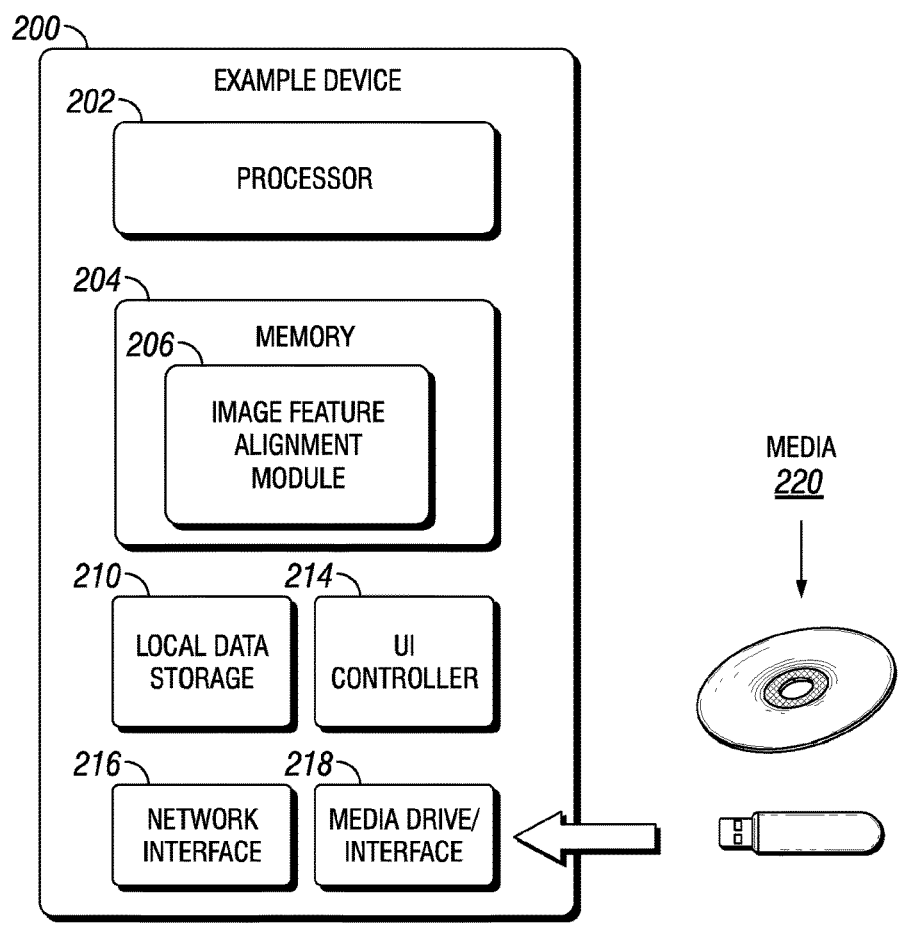

FIGS. 2A and 2B illustrate an example device 200, with a processor 202 and memory 204 for hosting an image feature alignment module 206 configured to implement various embodiments of image feature alignment as discussed in this disclosure. Memory 204 can also host one or more databases and can include one or more forms of volatile data storage media such as random access memory (RAM), and/or one or more forms of nonvolatile storage media (such as read-only memory (ROM), flash memory, and so forth).

Device 200 is one example of a computing device or programmable device, and is not intended to suggest any limitation as to scope of use or functionality of device 200 and/or its possible architectures. For example, device 200 can comprise one or more computing devices, programmable logic controllers (PLCs), etc.

Further, device 200 should not be interpreted as having any dependency relating to one or a combination of components illustrated in device 200. For example, device 200 may include one or more of a computer, such as a laptop computer, a desktop computer, a mainframe computer, etc., or any combination or accumulation thereof.

Device 200 can also include a bus 208 configured to allow various components and devices, such as processors 202, memory 204, and local data storage 210, among other components, to communicate with each other.

Bus 208 can include one or more of any of several types of bus structures, including a memory bus or memory controller, a peripheral bus, an accelerated graphics port, and a processor or local bus using any of a variety of bus architectures. Bus 208 can also include wired and/or wireless buses.

Local data storage 210 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 212 may also communicate via a user interface (UI) controller 214, which may connect with I/O device(s) 212 either directly or through bus 208.

In some implementations, a network interface 216 may communicate outside of device 200 via a connected network, and in some implementations may communicate with hardware, such as equipment 130, one or more sensors 140, etc.

In some embodiments, equipment 130 may communicate with device 200 as input/output device(s) 212 via bus 208, such as via a USB port, for example.

A media drive/interface 218 can accept removable tangible media 220, such as flash drives, optical disks, removable hard drives, software products, etc. In some implementations, logic, computing instructions, and/or software programs comprising elements of image feature alignment module 206 may reside on removable media 220 readable by media drive/interface 218.

In some embodiments, input/output device(s) 212 can allow a user to enter commands and information to device 200, and also allow information to be presented to the user and/or other components or devices. Examples of input device(s) 212 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of image feature alignment module 206 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In some implementations, device 200, or a plurality thereof, can be employed at wellsite 100. This can include, for example, in various equipment 130, in logging and control system 144, etc.

Example System(s) and/or Technique(s)

Figure 3:
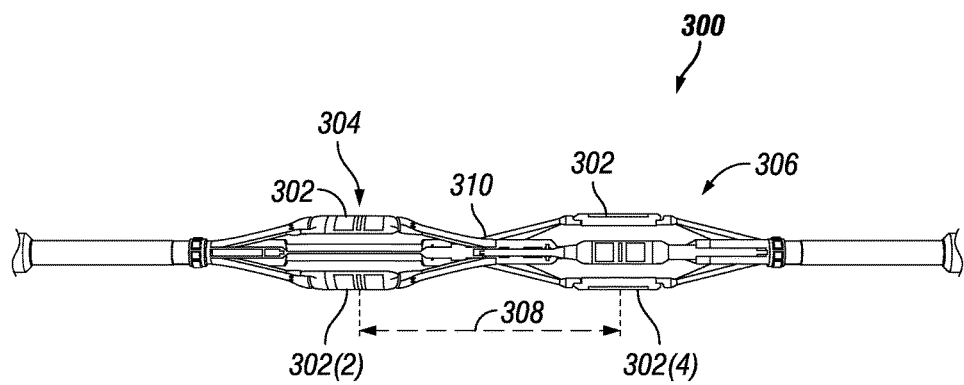
FIG. 3 illustrates an example downhole tool configured to collect borehole information in accordance with implementations of image feature alignment.

FIG. 3 illustrates an example downhole tool 300 configured to collect information for use in creating sub-images of borehole 102 in accordance with implementations of image feature alignment. It will be understood that tool 300 can include any other tools capable of measuring physical properties (such as, for example, seismic properties, electrical resistivity, gamma rays, nuclear magnetic resonance, ultrasonic images, spectroscopy, etc.) in borehole 102. In some implementations, tool 300 can include any of equipment 130. In this regard, it should be further understood that the features of tool 300 may be implemented any suitable downhole tool, including wireline tools in addition to drill strings such as, for example, the one illustrated in FIG. 1.

Tool 300 can include one or more pads 302, with each pad 302 including one or more sensors configured to measure physical properties in borehole 102. As illustrated in FIG. 3, in some implementations, tool 300 can have multiple pads 302 around its circumference. Moreover, tool 300 can have multiple sets of pads 302 along its length. For example, a first set of pads 302 can be located at a first location 304 on tool 300 and a second set of pads 302 can be located at a second location 306 on tool 300. As many pads 302 as desired can be located on tool 300. Also, pads 302 can be placed in as many locations as desired (including, for example, three locations) on tool 300.

Pad 302(2) at first location 304 on tool 300 can be a distance 308 away from pad 302(4) at second location 306. Also, in one possible aspect, first location 304 and second location 306 can sit on opposing sides of a center 310 of tool 300.

Information associated with borehole 102 can be collected in any way desired using tool 300. For example, in some embodiments, information associated with borehole 102 can be obtained using tool 300 while drilling wellbore 102.

Additionally, or alternately, in some implementations, information associated with borehole 102 can be obtained after drilling through the use of tools such as wireline tools. For example, tool 300 can be lowered to a desired position in borehole 102 (including a bottom of borehole 102) and pulled to the surface using, for example, a cable. Measurements of borehole 102 can be made by pads 302 as tool 300 descends into borehole 102 from the surface and/or on its way back to the surface. In one possible aspect, several passes can be made by tool 300 into and out of borehole 102 in order to collect information associated with borehole 102.

In collecting information regarding borehole 102, pads 302 can move through borehole 102 in any way desirable, including rotating about an axis defined by borehole 102 and/or sliding along a length of borehole 102. For example, in some implementations (such as, for instance, during a drilling process), one or more pads 302 on tool 300 can rotate within borehole 102 as they collect information regarding borehole 102. In another possible implementation (such as, for instance during a wireline operation), pads 302 can be non-rotating, collecting information in a given azimuthal range of borehole 102 as they are moved along a length of borehole 102.

Figure 4:
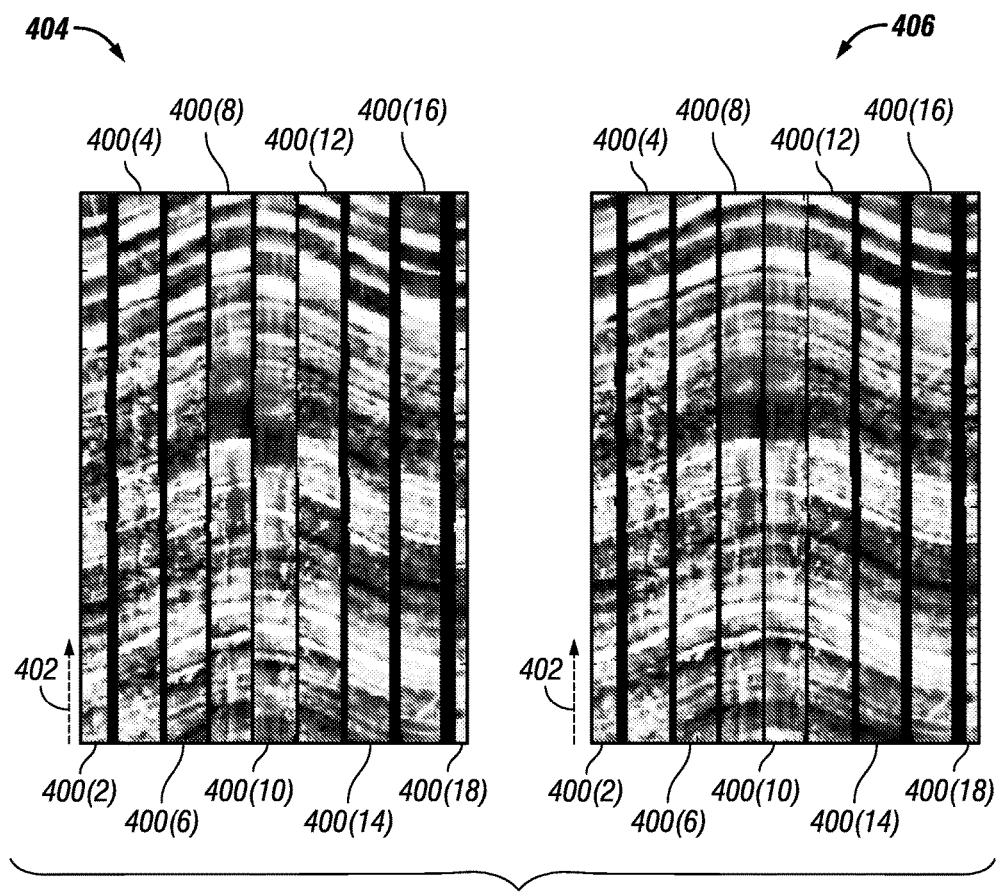
FIG. 4 illustrates a plurality of sub-images of a borehole in accordance with implementations of image feature alignment.

FIG. 4 illustrates a plurality of sub-images 400 of borehole 102 in accordance with implementations of image feature alignment. In some implementations, sub-images 400 can be created, at least partially, using information gathered by pads 302 associated with tool 300.

Sub-images 400 are illustrated in FIG. 4 as representations of sections of borehole 102 along a depth 402 of borehole 102. In some implementations, these sections of borehole 102 can include azimuthal ranges of borehole 102. Sub-images 400 can be created, for example, from information collected using one or more pads 302 on a non-rotating tool, such as a wireline tool 300. Alternately, or additionally, sub-images 400 can be created using information collected using one or more pads 302 on a rotating tool 300, such as on equipment 130.

In some implementations, a raw sub-image collection 404 can be created by placing sub-images 400 of adjacent sections of borehole 102 next to each other to create a rough panorama view of all or a portion of borehole 102. In some embodiments, the various sub-images 400 in raw sub-image collection 404 may be misaligned, such that a feature in one individual sub-image 400 may not line up at a same depth 402 in an adjacent sub-image 400. Misalignment of sub-images 400 like this can be the result of numerous factors, including, for example, dynamics of tool 300 such as differential placement of pads 302 at locations 304,306 on tool 300, acceleration of tool 300 as it moves through borehole 102 while pads 302 are taking measurements, etc.

In some implementations, a true depth of one or more pads 302 on tool 300 may be unknown. In one possible aspect, a depth of pads 302 in borehole 102 can be estimated based, at least partly, on the length of cable used to lower tool 300 into borehole 102. However, in some instances the cable can stretch.

Moreover, measurements from pads 302 can be corrupted by various forms of noise in and around borehole 102, including, for example, noise from various equipment 130 in borehole 102.

In some implementations, the dynamics of tool 300 as it is pulled to the surface may not be constant. For example, the measured speed of tool 300 may not be the same as the actual speed of tool 300. In such cases, sampling of the formation 142 may not occur at the same rate as measured at the surface. Consequently, displayed features in a sub-image 400 can appear stretched/compressed in comparison to the actual features in the formation 142.

In some implementations, any combination of the above factors can result in misalignment of the sub-images 400 in raw sub-image collection 404.

In some embodiments, it may be desirable to remediate the misalignment of sub-images 400 in raw sub-image collection 402 to arrive at a unified borehole image 406 in which features across the various sub-images 400 are aligned. In some implementations, this can be accomplished by shifting (i.e. moving, compressing and/or stretching) various portions of one sub-image 400 relative to an adjacent sub-image 400 using implementations of image feature alignment as described herein.

Once created, unified borehole image 406 can be used to evaluate formation 142 and identify points of interest including structural dips, faults, fractures, etc., in formation 142. Unified borehole image 406 can be also useful in other applications such as, for example, net pay evaluation in thinly bedded formations, analysis of the stability of borehole 102, etc.

Unified borehole image 406 can be constructed from as many sub-images 400 as desired. For example, in some implementations, unified borehole image 406 can be created from two adjacent sub-images 400. In some implementations, unified borehole image 406 can be created from enough sub-images 400 to map an entire circumference of borehole 102.

Figure 5:
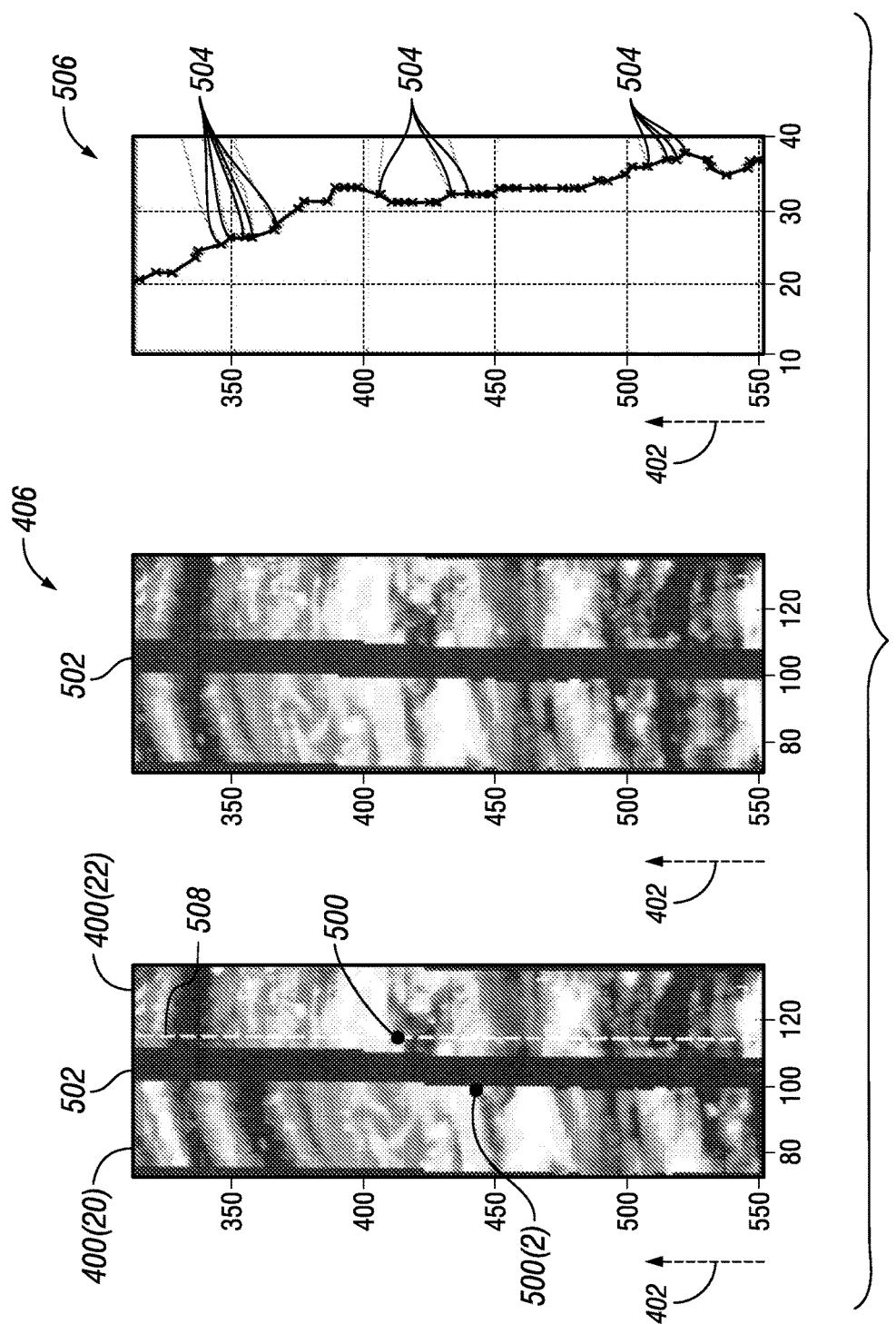
FIG. 5 illustrates the alignment of two adjacent sub-images of a borehole in accordance with implementations of image feature alignment.

FIG. 5 illustrates the alignment of two adjacent sub-images 400(20), 400(22) of borehole 102 in accordance with implementations of image feature alignment. In some implementations, an automated algorithm can be used to align adjacent sub-images 400 by aligning one or more features, such as edges, dips, fractures, etc., common to sub-images 400(20), 400(22). In one possible aspect, the algorithm can work on sub-images 400 of a borehole 102 having any possible orientation, (vertical, horizontal, etc.), and the algorithm can be separated into various stages.

In some implementations, a first stage of the algorithm can be defined as local alignment in which a reference feature point 500 in sub-image 400(22) is selected and local feature matching is used to search for a corresponding matching candidate feature point 500(2) in adjacent sub-image 400(20).

In some implementations, reference feature point 500 and corresponding matching candidate feature point 500(2) are associated with a portion of a feature common to both sub-images 400(20), 400(22).

Reference feature point 500 can be searched for in sub-image 400(22) using any methods known in the art, including, for example, gradient-based methods, the use of matching criteria, etc.

Corresponding matching candidate feature point 500(2) can be searched for in sub-image 400(20) using any methods known in the art, including, for example, gradient-based methods, the use of matching criteria, etc. However, since sub-images 400(20), 400(22) may include multiple features, it's possible that multiple candidate feature points may be located in sub-image 400(20) representing possible matches to reference feature point 500 in sub-image 400(22).

In some implementations, each candidate feature point can have an associated shift to bring it into alignment with reference feature point 500 in sub-image 400(22). A shift can include moving, compressing, and/or stretching one or more portions of sub-image 400(20) to align the candidate feature point in sub image 400(20) with reference feature point 500 in sub-image 400(22).

In one possible aspect, in a second stage of the algorithm, the multiple candidate feature points can be pruned (using, for example, global solution pruning) to isolate matching candidate feature point 500(2). In some embodiments, matching candidate feature point 500(2) can be isolated based on a desirable shift associated therewith that can be used to bring matching candidate feature point 500(2) in sub-image 400(20) into alignment with reference feature point 500 in sub-image 400(22).

Shifts associated with candidate feature points can be calculated using any techniques known in the art, including, for example, the use of a regularization function based on known and/or estimated dynamics of tool 300.

In some implementations, to identify desirable shifts, the multiple candidate feature points can be formulated into a global optimization framework taking into account dynamics of tool 300 such as acceleration, locations of pads 302, etc.

Moreover, in the first stage of the algorithm, more than one reference feature point 500 can be isolated in sub-image 400(22). In such an instance, potential shifts to bring the various multiple candidate feature points in sub-image 400(20) into alignment with their corresponding reference feature points 500 in sub-image 400(22) can be formulated in a global optimization framework. From this universe of possible shifts associated with each candidate feature point, matching candidate feature points 500(2) can be chosen to result in a smooth alteration of sub-image 400(20) to bring sub-image 400(20) into alignment with sub-image 400(22).

For example, matching candidate feature points can be chosen based on their probability of being associated with given reference feature points.

Alternately, or additionally, stages one and two can be repeated as many times as desired with reference feature points 500 at various depths 402 in sub-image 400(22). In such a manner, multiple shifts corresponding to multiple matching candidate feature points 500(2) can be located to bring multiple portions of sub-image 400(20) into alignment with sub-image 400(22).

In some implementations, pads 302 may be located on tool 300 in such numbers and/or orientations, that they do not cover the full 360 degrees of borehole 102. For example, pads 302 can have gaps 502 in their azimuthal coverage of borehole 102. In such instances, local image alignment (aka local feature matching) in the first stage of the algorithm can be challenging. One possible solution can be the estimation of data missing in gaps 502 using any method known in the art, including, for example, inpainting algorithms. For instance, in some embodiments, information in the one or more sub-images 400 closest to the gap 502 can be used to estimate the missing information in gap 502. In some embodiments, information from a single sub-image 400 close to gap 502 can be used to estimate the missing information in gap 502.

Once gaps 502 are filled, a global template comprising actual and estimated pixel information can be created, such that a variety of searches can be conducted, including, for example, searches for reference feature point(s) 500, candidate feature points, etc.

Example Automated Algorithm

In some implementations, tool 300 can have two pads 302(2), 302(4) located at different depths 402 in borehole 102 with the physical distance 308 between pads 302(2), 302(4) on tool 300 being known. Pad 302(2) can be called an upper pad, and can be located at first location 304, and pad 302(4) can be called a lower pad and can be located at second location 306. In one possible aspect, the terms upper pad and lower pad can derive from a depth of the corresponding pad 302 relative to center 310 of tool 300.

In some implementations, a second sub-image 400(20) (aka $I_L(x,y)$) can be associated with lower pad 302(4) and a first sub-image 400(22) (aka $I_U(x,y)$) can be associated with upper pad 302(2). In one possible aspect, one or more portions of sub-image $I_L(x,y)$, such as one or more rows of sub-image $I_L(x,y)$, can be shifted by a parameter $\tau_y$, such that one or more features in sub-image $I_L(x,y)$ can be aligned with corresponding features in sub-image $I_U(x,y)$ to create unified borehole image 406. The estimated value of the shifts at various depths in sub-image $I_L(x,y)$ is shown in a graph of estimated shift 506. In some embodiments, shifts can be calculated at various points 504 corresponding to various depths 402. Values for shifts in between points 504 can be extrapolated, such as, for example, via straight line estimation between adjacent points 504, etc.

In some embodiments, an intermediate unified borehole image can be expressed as $I_L(x,y)+I_U(x,y)$. In one possible aspect, one or more measurements in sub-image $I_L(x,y)$ can be shifted along the y-axis (i.e. depth 402) to arrive at unified borehole image 406 shown in FIG. 5. The aligned sub-image $\tilde{I}_L(x,y)$ can be defined by:

$$\tilde{I}_L(x,y) = I_L(x, y+\tau_y), \quad (1)$$

where $\tau_y$ represents the shift along the y-axis for each depth 402.

In some implementations, alignment of sub-images $I_L(x,y)$, $I_U(x,y)$ can be formulated as estimating the variable $\tau_y$ (as shown in graph of estimated shift 506, where values for $\tau_y$ are shown along the x-axis). In one possible aspect, the value of the shift can be a function of depth, and can change at different y-locations in sub-image $I_L(x,y)$.

In accordance with some implementations, a possible algorithm to estimate the shift $\tau_y$ can begin with selecting a set of one or more reference feature points $\{(x_1,y_1), (x_2,y_2), \ldots, (x_N,y_N)\}$ in sub-image $I_L(x,y)$, where N defines the total number of reference feature points. The extracted reference feature points can correspond to borehole image features such as edges, dips, fractures, etc. In one possible aspect, such reference feature points can have a high enough contrast to be matched with matching candidate feature points in the $I_U(x,y)$ sub-image.

The reference feature points can be selected in several ways including manually by a user, or automatically by a reference feature point selection algorithm. In some implementations, for each reference feature point, the algorithm can estimate a value of $\tau_y$ for a corresponding candidate feature point in the sub-image $I_U(x,y)$. In some instances this can be challenging since the lower pads 302 and upper pads 302 may not cover the same segment of borehole 102, and therefore gaps 502 may exist between the lower and upper sub-images. Stated another way for the sake of clarity, the sub-images $I_L(x,y)$, $I_U(x,y)$ can have a value of zero in regions where pads 302 do not cover borehole 102 (for example gaps 502 where no azimuthal overlap of information exists). Such gaps 502 can complicate the feature matching process in several ways. For example, if a feature is not continuous across a displayed sub-image, it may not be visible in the lower and upper sub-images. Also, the orientation of the feature in the sub-images may be different for large gaps 502. For example, in one sub-image a peak of a dip may be observed, while in the other a trough may be visible.

In some implementations, such an issue can be resolved by including a global template generation stage prior to feature matching. For example, the global template generation stage could take as input the upper sub-image $I_U(x,y)$, and estimate pixel values in gaps 502 based on pixels in upper sub-image $I_U(x,y)$. The new estimated image with the filled gaps can be defined by I_hat_u(x,y) and be called a global template.

In some implementations, the image global template I_hat_u(x,y), can reduce the complexity of the feature matching stage. In one possible aspect, for each reference feature point, a corresponding shift $\tau_y$ may be found by decreasing and/or minimizing the log-likelihood between I_hat_u(x,y) and $I_L(x,y+\tau_y)$. In some implementations, log-likelihood can be expressed as mean squared error (MSE)

In some implementations, a feature matching algorithm can be defined on the local scale of a sub-image $I_U(x,y)$, $I_L(x,y)$. For this reason, local feature matching can result in multiple solutions (such as, for example, multiple candidate feature points). In some implementations, it may be difficult to determine a desirable shift due to periodicity of the dips, etc., in sub-images of borehole 102. In some embodiments, this issue can be resolved in the global solution pruning stage.

In some implementations, in the global pruning stage, a global optimization algorithm can search through one or more possible combinations of shifts related to one or more possible groups of candidate feature points. In one possible aspect, the set of shifts which minimizes a cost criterion can be selected as the desired estimate, and the candidate feature points corresponding to the selected set of shifts can be called matching candidate feature points. In one possible aspect, the cost function which is minimized can take into account both the dynamics of tool 300 and the accuracy of the matching estimate. Moreover, if desired, a user can also manually specify a shift to be selected.

In some embodiments, the complexity of the search though the possible combinations of shifts can grow exponentially with the number of reference feature points. In some implementations, the search can be implemented by using a Viterbi algorithm.

When feature selection is automated, the algorithm can automatically select the reference feature points in $I_L(x,y)$. In some implementations, the features can be selected to decrease and/or minimize the ambiguity of searching for the corresponding features in $I_U(x,y)$. In one possible aspect, reference feature points can be chosen from any high contrast regions, such as, for example, dips, fractures, edges, etc. In some embodiments, to automatically detect these features a 1D signal can be extracted on a boundary 508, placed wherever desired in sub-image $I_L(x,y)$. In some implementations, a gradient of this 1D signal can be related to edge information in sub-image $I_L(x,y)$. In one possible aspect, a large absolute value of the gradient can indicate that an edge may be present, whereas a lower value may indicate a flat region. In some implementations, the reference feature points can be selected as the N largest values of the absolute gradient.

In some embodiments, the global template I_hat_u(x,y) can be created by, for example, an inpainting algorithm. In such a method, estimated pixels to fill in gaps 502 can be estimated as a sum of weighted pixels in the neighborhood of the missing pixels. These weights can be determined, for example, by the local image gradients such that the edges can be accurately extrapolated. For instance, inpainting can be implemented from a boundary of each gap 502 towards a center of each gap 502.

In some implementations, with regard to local feature matching, for each reference feature point in the set $\{(x_1,y_1), (x_2,y_2), \ldots, (x_N,y_N)\}$, a shift T corresponding to a candidate feature point can be sought. To identify this shift, when the global template I_hat_u(x,y) and the left hand-side sub-image $I_L(x,y+T)$ are adequately lined up, the error I_hat_u$(x,y)-I_L(x,y+\tau)$ may have a low magnitude. In one possible aspect, to identify the shift, the following cost function can be decreased and/or minimized:

$$E_i(\tau) = \sum_{x \in W_{xi}} \sum_{y \in W_{yi}} (I\_hat\_u(x,y) - I_L(x,y+\tau))^2, \quad (2)$$

where $W_{xi}=[x_i-L/2, x_i-L/2+1, \ldots, x_i+L/2]$ and $W_{yi}=[y_i-L/2, y_i-L/2+1, \ldots, y_i-L/2]$ define a window around the i-th reference feature point $(x_i,y_i)$, projected to a location on the lower pad (such as, for example lower pad 302(4)). In some implementations, an optimization problem to find the shift $\tau_i$ can then be defined as:

$$\tau_i = \underset{\tau}{\mathrm{argmin}}\{E_i(\tau)\}. \quad (3)$$

In some implementations, this can be solved by, for example, a brute force method, where the total error in (2) is evaluated for each possible value of the shift, or by advanced lower complexity methods known in the art.

Figure 6:
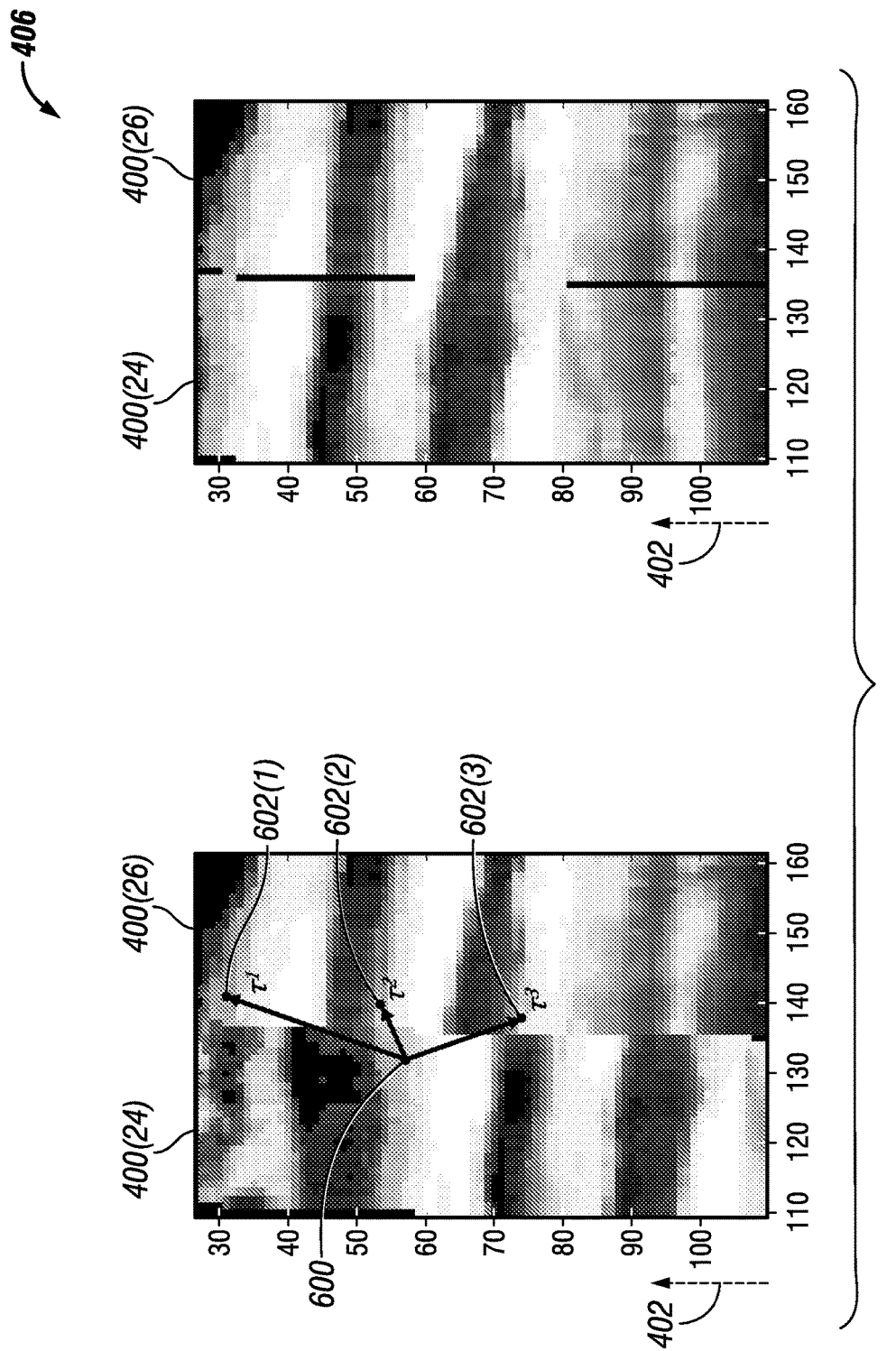
FIG. 6 illustrates possible challenges in identifying a desirable shift using local information in sub-images in accordance with implementations of image feature alignment.

FIG. 6 illustrates possible challenges which may arise in identifying a desirable shift (and therefore a matching candidate feature point) using local information in a sub-image in accordance with implementations of image feature alignment. For instance, in some implementations, when the shift is evaluated using the local information around the reference feature point $(x_i, y_i)$, a less than desirable solution may be chosen. This includes when a reference feature, such as a dip, appears in multiple regions of the global template I_hat_u(x,y). For example, in some implementations, each candidate feature point may result in a low value of the cost function in eq. (2) so nothing exists to guard against the choice of an undesirable and/or unsatisfactory candidate feature point. For these reasons, in some embodiments, a global optimization algorithm can be used to conduct global solution pruning in which a matching candidate feature point can be chosen from a variety of candidate feature points by utilizing of a wide variety of information, including global information. In some implementations, global solution pruning can include local information around the reference feature point $(x_i, y_i)$ within such global information.

For example, for reference feature point 600 in sub-image 400(24), several different possible solutions in the form of candidate feature points 602(1), 602(2), 602(3) can be located in sub-image 400(26). As illustrated, each candidate feature point 602(1), 602(2), 602(3) is associated with a corresponding shift $\tau^1, \tau^2, \tau^3$ to align the dips in the sub-images 400(26), 400(24). Unified borehole image 406 shows the aligned sub-images 400(26), 400(24) when a desirable shift $\tau^1$ is selected, matching feature point 600 with matching candidate feature point 602(1).

In some embodiments, a local alignment algorithm may not take into account relationships between neighboring feature points 600. For example, under normal tool acceleration, closely spaced feature points 600 could also have a similar shift, and this information could be utilized to improve sub-image alignment results. This information can be taken into account by regularizing the cost function. The new cost function can be defined as:

$$\ldots J(\tau_1,\tau_2,\ldots,\tau_N) = \Sigma_{i=1}^{N}\{Ei(\tau_i) + \lambda f(\tau_i)\}, \quad (4)$$

where $f(\tau_i)$ can be a general regularization function and $\lambda$ can determine the trade-off between conventional matching and the regularization cost. For example, in the case where $\lambda=0$ the problem can be equivalent to eq. (3), whereas setting $\lambda$ such that $\lambda f(\tau_i) \gg E_i(\tau_i)$ means that J(.) can be determined by the regularization function.

In some implementations, a variety of different regularization functions can be used. For example, a regularization function may be chosen to decrease and/or minimize the energy of shifts $f(\tau_i) = (\tau_i)^2$ or ensure that the chosen shifts are desirably smooth $f(\tau_i) = |\tau_i - \tau_{i-1}|$. Any regularization metrics known in the art can be used for such efforts.

In some implementations, a regularization function can be used to take into account dynamics of tool 300 and depth of locations of reference feature points 600 as:

$$f(\tau_i | \tau_{i-1}) = |\tau_i - \tau_{i-1}| \exp(-\lambda_1 |y_i - y_{i-1}|). \quad (5)$$

In some embodiments, the regularization function can penalize reference feature points which are closely spaced, i.e. $|y_i - y_{i-1}| \sim 0$. In such a case, the regularization function can be approximately equal to $f(\tau_i) \sim |\tau_i - \tau_{i-1}|$. In the case when reference feature points are spaced a large distance apart, i.e. $|y_i - y_{i-1}| \gg 0$, the regularization function $f(\tau_i) \sim 0$. This can agree with the interpretation that closely spaced reference feature points can have a larger smoothness constraint than anchor points which are far away.

In one possible aspect, parameter $\lambda_1$ can determine the decay of the regularization function, and therefore it can be a function, for example, of acceleration of tool 300. For a large acceleration, this value could be large and vice-versa for a low acceleration of tool 300. In the case when the acceleration data is not available, in some implementations, the parameter can be set to a constant.

In some embodiments, the global optimization effort to find shifts can therefore be formulated as:

$$[\tau_1, \tau_2, \ldots, \tau_N] = \underset{\tau_1,\tau_2,\ldots,\tau_N}{\mathrm{argmin}}\{J(\tau_1, \tau_2, \ldots, \tau_N)\}. \quad (6)$$

In some implementations, this can be solved by any gradient descent algorithm known in the art and/or by using any other methods known in the art.

In some embodiments, a low complexity method can be utilized by noting that the cost function has a Markov chain structure. This structure can be seen in eq. (5) where the regularization cost $f(\tau_i | \tau_{i-1})$ is conditioned on $\tau_{i-1}$ and can be independent of the previous shifts. Given the Markov chain structure, the cost function can be expressed as a weighted graph. In some embodiments, each column in such a graph can represent a reference feature point 600 and each value in the column can represent a value that the shift can take. The Markov structure allows the minimization problem to be simplified as finding a path through the weighted graph, where the additive cost between two nodes is equal to $E(\tau_i) + \lambda f(\tau_i | \tau_{i-1})$. In one possible aspect, the minimum path through such a graph can be evaluated by a low complexity Viterbi algorithm and hence a desirable global shift can be found.

Example Algorithm Extension to Multiple Pads

In some implementations, the algorithm(s) discussed above can be extended for use with more than two pads 302. For example, tool 300 can include multiple pads 302 at first location 304 and second location 306. Tool 300 can also include more locations than first location 304 and second location 306.

In some implementations, four pads 302 can be utilized at first location 304 and four pads 302 can be utilized at second location 306 (though it will be understood that more or less pads 302 can also be used). In one possible aspect, the sub-images from the lower pads 302 and upper pads 302 can be defined by $$\{I_L^1(x,y), I_L^2(x,y), I_L^3(x,y), I_L^4(x,y)\},$$

and $$\{I_U^1(x,y), I_U^2(x,y), I_U^3(x,y), I_U^4(x,y)\},$$

In some implementations, a possible mapping with regard to elements in FIG. 4 can include:

$I_L^1(x,y)$—400(2)
$I_L^2(x,y)$—400(6)
$I_L^3(x,y)$—400(10)
$I_L^4(x,y)$—400(14)
$I_U^1(x,y)$—400(4)
$I_U^2(x,y)$—400(8)
$I_U^3(x,y)$—400(12)
$I_U^4(x,y)$—400(16)

In some implementations, a similar formulation as that discussed above in conjunction with automated feature selection can be used. For example, the sub-images 400 can be equal to the formation measurements at pixel locations where the pads 302 cover borehole 102 and be zero otherwise. For example, pads 302 at first location 304 and pads 302 at second location 306 can be located at different depths 402. In one possible aspect, this can be modelled by a parameter $\tau_y$, which can represent the global shift between the sub-images 400 from the lower pads 302 and the sub-images 400 from the upper pads 302.

In some implementations, in addition to the global shift, the individual pads 302 can be at a different depth relative to their neighbors at each location 304, 306. This can occur, for example, if tool 300 is tilted and/or one of the pads 302 is stuck against borehole 102. In one possible aspect, this can be modeled by a local shift $\Delta\tau_y$. In another possible aspect, it can be assumed that the global shift is larger than the local shift $|\tau_y| > |\Delta\tau_y|$.

In some embodiments, unified borehole image 406 can therefore be expressed by eq. (7):

$$I(x,y) = I_L^1(x,y) + \Sigma_{i=2}^4 I_L^i(x,y+\Delta\tau^i) + \Sigma_{j=1}^4 I_U^j(x,y+\tau+\Delta\tau^j) \quad (7)$$

where $I_L^1(x,y)$ is a reference sub-image in which one or more reference feature points are chosen. An image alignment problem for multiple pads can therefore be formulated as finding parameters $\tau_y$, $\{\Delta\tau_y^i\}$ and $\{\Delta\tau_y^j\}$. In some implementations, the parameters can be solved in several stages. First the shift $\tau_y$ can be estimated by using the same solution as in the "Example Automated Algorithm" section above. One difference in the formulation can be that the cost function in eq. (2) can be extended to multiple pads 302. Then, the local shifts $\{\Delta\tau_y^i\}$ and $\{\Delta\tau_y^j\}$ can be iteratively solved by assuming that the global shift is zero.

Example Quality Control (QC) Metrics

In some implementations, results for various shifts can be verified by a visual inspection and/or by use of quantitative metrics that can be correlated to visual quality of the sub-images 400 and/or the unified borehole image 406. For example, if the value of the quantitative metric is above a certain threshold, a user can visually verify the results at that location and manually adjust the image alignment if desired.

A variety of metrics known in the art can be used for such QC purposes, including, for example, log-likelihood—such as defined in eq. (2); and regularization error—such as defined in eq. (5). In some implementations, feature matching can be implemented by minimizing the sum of log-likelihood and regularization error to give an indication of image quality.

Figure 7:
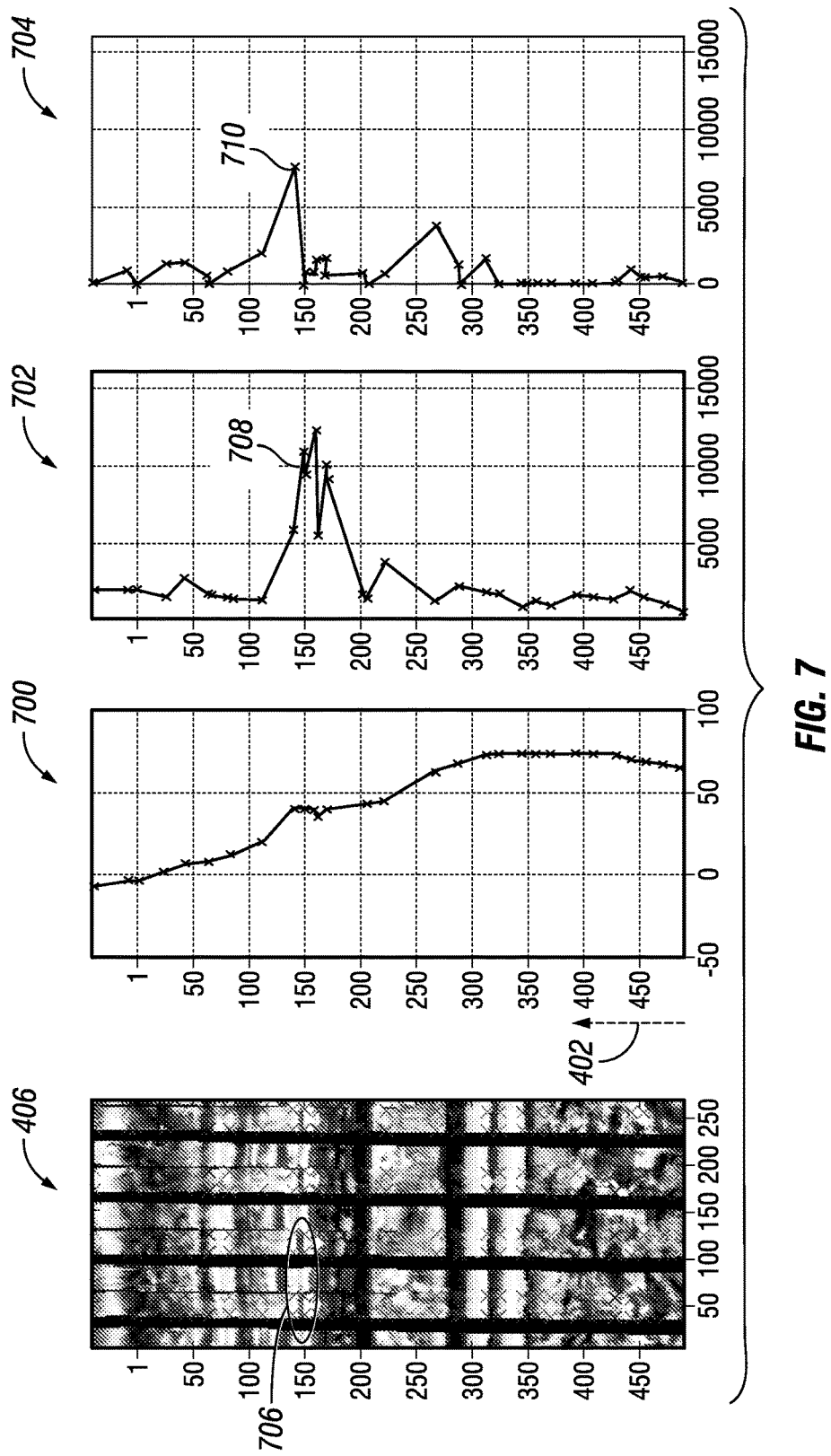
FIG. 7 illustrates example quality control metrics plotted alongside a unified borehole image.

FIG. 7 illustrates example quality control metrics plotted alongside a unified borehole image 406 (i.e. a compensated image). The quality control metrics include a graph 700 of estimated shift versus depth, a graph 702 of log-likelihood (which in one possible implementation can be expressed as, for example, mean squared error (MSE)) versus depth 402, and a graph 704 of regularization error versus depth 402. For example, in unified borehole image 406 an artefact 706 is visible at line 150 where the shift between lower pads 302 and upper pads 302 may have been inaccurately estimated (i.e. bedding illustrated in unified borehole image 406 may not line up at this depth location). Artefact 706 corresponds to a high log-likelihood 708 and a high regularization error 710.

In some implementations, quality control can be automated. For example, log-likelihood and/or regularization errors for one or more estimated shift values at various depths can be reviewed to confirm that they are below a preset threshold. If they aren't, remediation efforts can be initiated, including rerunning the algorithm above to locate improved candidate matching points, requesting user intervention to help manually align one or more features responsible for the log-likelihood and/or regularization errors, etc. In one possible aspect, such automated quality control can be performed using, for example, image feature alignment module 206.

Example Methods

Figure 8:
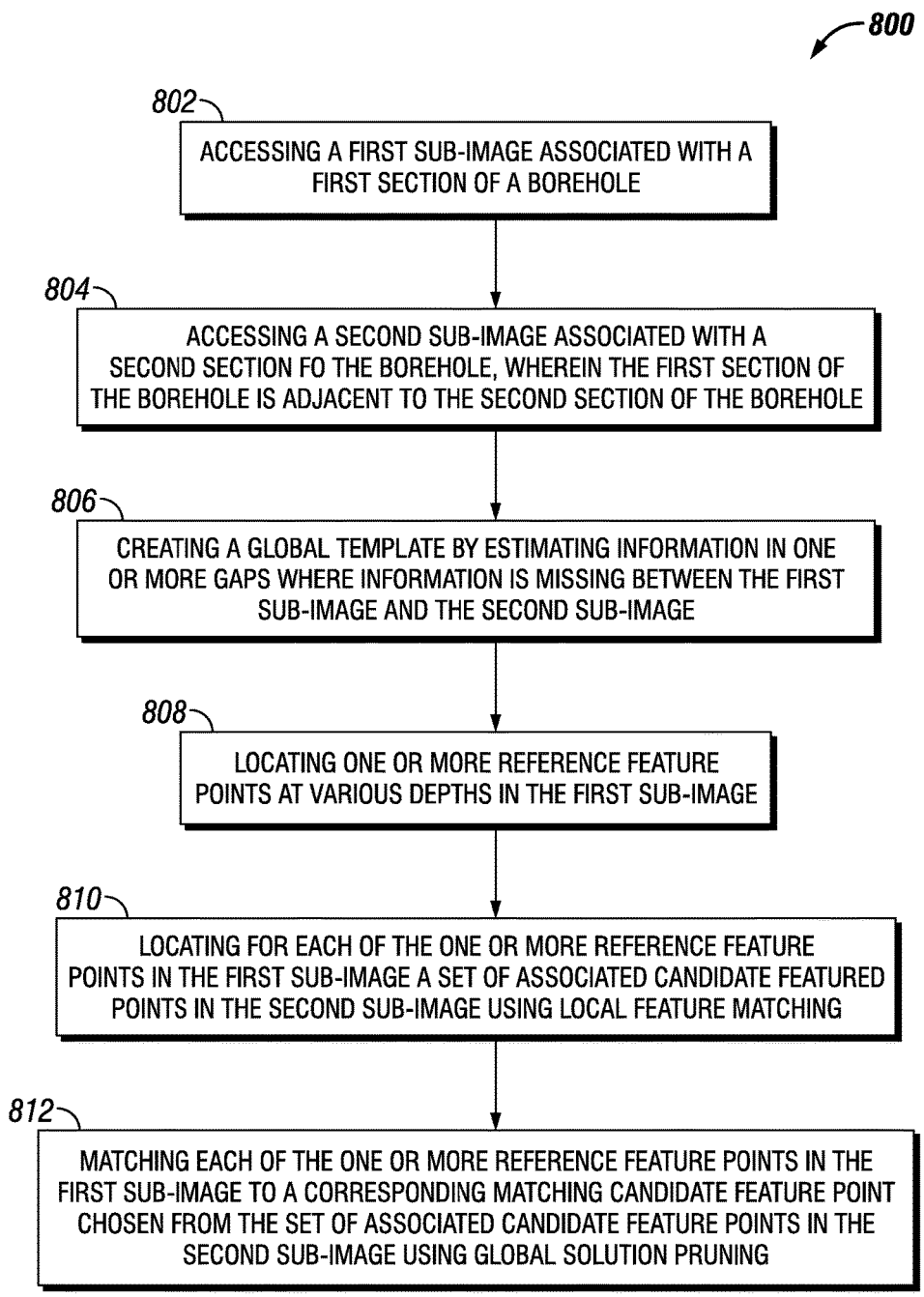
FIG. 8 illustrates an example method associated with embodiments of image feature alignment.
Figure 9:
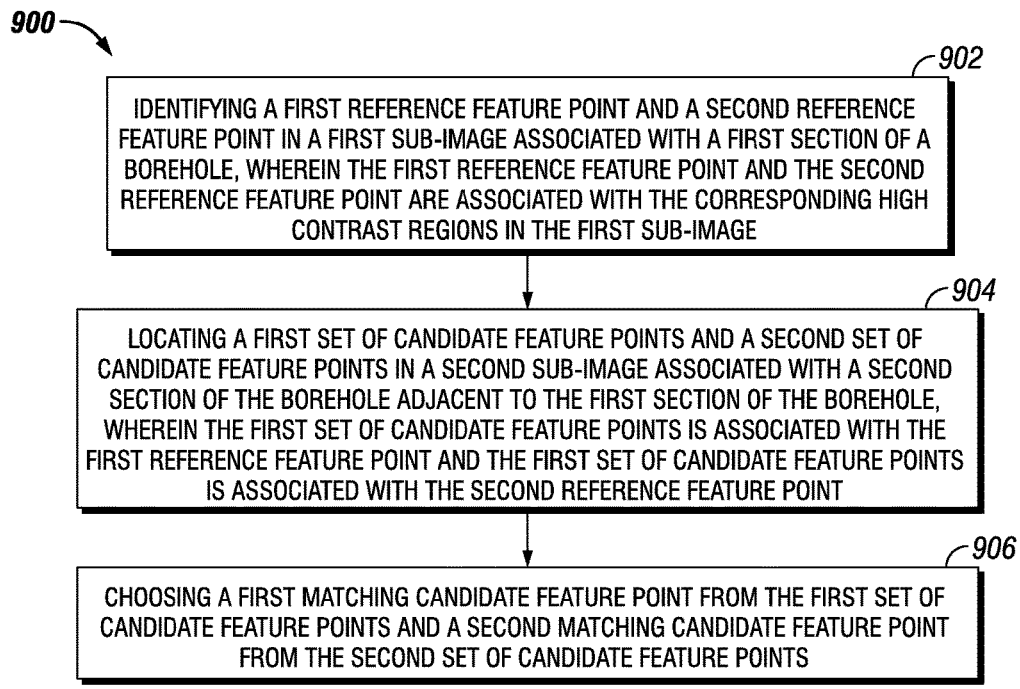
FIG. 9 illustrates an example method associated with embodiments of image feature alignment.
Figure 10:
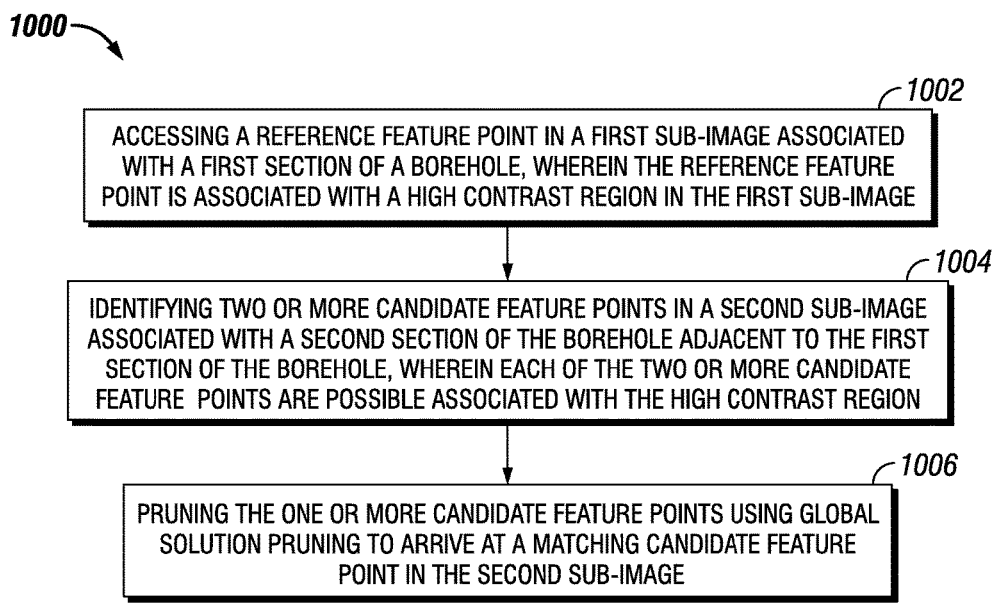
FIG. 10 illustrates an example method associated with embodiments of image feature alignment.

FIGS. 8-10 illustrate example methods for implementing aspects of image feature alignment. The methods are illustrated as a collection of blocks and other elements in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks and/or elements may be deleted from the methods without departing from the spirit and scope of the subject matter described therein. In the context of software, the blocks and other elements can represent computer instructions that, when executed by one or more processors, perform the recited operations. Moreover, for discussion purposes, and not purposes of limitation, selected aspects of the methods may be described with reference to elements shown in FIGS. 1-7.

FIG. 8 illustrates an example method 800 associated with embodiments of image feature alignment. At block 802 a first sub-image (such as sub-image 400(20)) associated with a first section of a borehole (such as borehole 102) is accessed.

At block 804 a second sub-image (such as sub-image 400(22)) associated with a second section of the borehole adjacent to the first section is accessed.

At block 806, a global template is created by estimating information in one or more gaps, such as gaps 502, where information is missing between the first sub-image and second sub-image. In some embodiments, the missing information can result when no azimuthal overlap of information exists between the first sub-image and second sub-image. In some implementations, data missing in the gaps can be estimated using any method known in the art, including, for example, inpainting algorithms.

At block 808, one or more reference feature points, such as reference feature point 500 and/or reference feature point 600, can be located at various depths in the first sub-image. In some implementations, the one or more reference feature points can be associated with high contrast regions such as edges, dips, fractures, etc., in the first sub-image. Moreover, the one or more reference feature points can be extracted from the first sub-image using any methods known in the art, including, for example, gradient-based methods.

At block 810, for each of the one or more reference feature points in the first sub-image, a set of associated candidate feature points (such as candidate feature points 602(1), 6012(2), 602(3)) is located in the second sub image using local feature matching. In some implementations, local feature matching can use matching criteria to locate the one or more candidate feature points in the second sub image.

At block 812, each of the one or more reference feature points in the first sub-image is matched to a corresponding matching candidate feature point (such as matching candidate feature point 500(2)) chosen from the set of associated candidate feature points in the second sub-image using global solution pruning. For example, in some implementations, global solution pruning can search through one or more possible combinations of shifts associated with the various candidate feature points from block 806 and select a set of shifts which decreases and/or minimizes a cost criterion associated with the shifts. The candidate feature points associated with the selected shifts become matching candidate feature points. In some implementations, the search in global solution pruning can be implemented using a Viterbi algorithm.

FIG. 9 illustrates another example method 900 associated with embodiments of image feature alignment. At block 902, a first reference feature point (such as reference feature point 500 and/or reference feature point 600) and a second reference feature point (such as reference feature point 500 and/or reference feature point 600) are identified in a first sub-image (such as sub-image 400(20) and/or sub-image 400(24)) associated with a first section of a borehole (such as borehole 102). In some implementations, the first reference feature point and the second reference feature point are associated with corresponding high contrast regions in the first sub-image.

At block 904, a first set of candidate feature points (such as candidate feature points 602(1), 6012(2), 602(3)) and a second set of candidate feature points (such as candidate feature points 602(1), 6012(2), 602(3)) are located in a second sub-image (such as sub-image 400(22) and/or sub-image 400(26)). In some implementations, the second sub-image is associated with a second section of the borehole adjacent to the first section of the borehole. In one possible aspect, the first set of candidate feature points can represent possible local solutions in the second sub-image corresponding to the first reference feature point. Similarly, the second set of candidate feature points can represent possible local solutions in the second sub-image corresponding to the second reference feature point.

At block 906, a first matching candidate feature point (such as matching candidate feature point 500(2)) is chosen from the first set of candidate feature points and a second matching candidate feature point (such as matching candidate feature point 500(2)) is chosen from the second set of candidate feature points. In some implementations, the first matching candidate feature point and the second matching candidate feature point are chosen using global solution pruning.

FIG. 10 illustrates another example method 1000 associated with embodiments of image feature alignment. At block 1002, a reference feature point (such as reference feature point 500 and/or reference feature point 600) is accessed in a first sub-image (such as sub-image 400(20) and/or sub-image 400(24)) associated with a first section of a borehole (such as borehole 102). In some implementations, the reference feature point is associated with a high contrast region in the first sub-image.

At block 1004, two or more candidate feature points (such as candidate feature points 602(1), 6012(2), 602(3)) are identified in a second sub-image (such as sub-image 400(22) and/or sub-image 400(26)). In some implementations, the second sub-image can be associated with a second section of the borehole adjacent to the first section of the borehole. Moreover, each of the two or more candidate feature points can be possibly associated with the high contrast region.

At block 1006, the one or more candidate feature points are pruning using global solution pruning to arrive at a matching candidate feature point (such as matching candidate feature point 500(2)) in the second sub-image.

The methods and processes described above may be performed by a processing system. The term "processing system" should not be construed to limit the embodiments disclosed herein to any particular device type or system. The processing system may include a single processor, multiple processors, or a computer system. Where the processing system includes multiple processors, the multiple processors may be disposed on a single device or on different devices at the same or remote locations relative to each other. The processor or processors may include one or more computer processors (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCM-CIA card), or other memory device.

The methods and processes described above may be implemented as computer program logic for use with the computer processor. The computer processor may be for example, part of a system such as system 200 described above. The computer program logic may be embodied in various forms, including a source code form or a computer executable form. Source code may include a series of computer program instructions in a variety of programming languages (e.g., an object code, an assembly language, or a high-level language such as C, C++, Matlab, JAVA or other language or environment). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

To the extent used in this description and in the claims, a recitation in the general form of "at least one of [a] and [b]" should be construed as disjunctive. For example, a recitation of "at least one of [a], [b], and [c]" would include [a] alone, [b] alone, [c] alone, or any combination of [a], [b], and [c].

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. Moreover, embodiments may be performed in the absence of any component not explicitly described herein.

The invention claimed is:

1. A method comprising:
obtaining a first sub-image corresponding to a first section of a borehole;
obtaining a second sub-image corresponding to a second section of the borehole, wherein the first section of the borehole is adjacent to the second section of the borehole;
creating, using a processing system, a global template by estimating information in one or more gaps where information is missing between the first sub-image and second sub-image;
locating, using the processing system, one or more reference feature points at various depths in the first sub-image;
locating, using the processing system, for each of the one or more reference feature points in the first sub-image a set of associated candidate feature points in the second sub image using local feature matching;
matching, using the processing system, each of the one or more reference feature points in the first sub-image to a corresponding matching candidate feature point chosen from the set of associated candidate feature points in the second sub-image using global solution pruning; and
based on the matching, aligning, using the processing system, the first sub-image and the second sub-image to create an image of the borehole.

2. The method of claim 1, further comprising:
estimating, using the processing system, information in the one or more gaps through use of an inpainting algorithm.

3. The method of claim 1, further comprising:
locating, using the processing system, the one or more reference feature points at various depths in the first sub-image automatically using a gradient-based method.

4. The method of claim 1, further comprising:
locating, using the processing system, the one or more reference feature points by screening for high contrast regions in the first sub-image.

5. The method of claim 1, further comprising:
identifying, using the processing system, shifts between each of the one or more reference feature points in the first sub-image and their associated candidate feature points in the second sub image.

6. The method of claim 1, further comprising:
locating, using the processing system corresponding matching candidate feature points in the second sub image by taking into account one or more dynamics associated with a tool used to collect information from which the first sub-image and the second sub-image were created.

7. The method of claim 1, further comprising:
performing, using the processor, quality control on one or more of the corresponding matching candidate feature points with regard to their associated reference feature points by using one or more of:
log-likelihood; and
regularization error.

8. The method of claim 1, further comprising:
creating, using the processing system, a unified borehole image comprising the first sub-image and the second sub-image such that each of the one or more reference feature points in the first sub-image is matched up to the corresponding matching candidate feature point in the second sub image.

9. The method of claim 8, further comprising:
creating, using the processing system, the unified borehole image comprising the first sub-image and the second sub-image by shifting one or more portions of the first sub-image relative to the second sub-image.

10. A method, comprising:
identifying, using a processing system, a first reference feature point and a second reference feature point in a first sub-image associated with a first section of a borehole, wherein the first reference feature point and the second reference feature point are associated with corresponding high contrast regions in the first sub-image;
locating, using the processing system, a first set of candidate feature points and a second set of candidate feature points in a second sub-image associated with a second section of the borehole adjacent to the first section of the borehole, wherein the first set of candidate feature points is associated with the first reference feature point and the second set of candidate feature points is associated with the second reference feature point;
choosing, using the processing system, a first matching candidate feature point from the first set of candidate feature points and a second matching candidate feature point from the second set of candidate feature points; and
based on the chosen first matching candidate feature point and the second matching candidate feature point, aligning, using the processing system, the first sub-image and the second sub-image to create an image of the borehole.

11. The method of claim 10, further comprising:
locating, using the processing system, the first reference feature point among one or more of:
a dip:
a fracture; and
an edge.

12. The method of claim 10, further comprising:
Identifying, using the processing system, the first reference feature point and the second reference feature point in the first sub-image automatically using a gradient-based method.

13. The method of claim 10, further comprising:
locating, using the processing system, the first set of candidate feature points and the second set of candidate feature points in the second sub-image using matching criteria.

14. The method of claim 10, further comprising:
choosing, using the processing system, the first matching candidate feature point from the first set of candidate feature points and choosing the second matching candidate feature point from the second set of candidate feature points using global solution pruning.

15. The method of claim 10, further comprising:
calculating, using the processing system, an estimated shift to align the first matching candidate feature point with the first reference feature point; and
performing, using the processing system, quality control by confirming that one or more of (a) a log-likelihood of the estimated shift and (b) a regularization error of the estimated shift, is below a preset threshold.

16. The method of claim 10, further comprising:
creating, using the processing system, a global template by estimating information in one or more gaps where no overlap of information exists between the first sub-image and the second sub-image.

17. The method of claim 10, further comprising:
shifting, using the processing system a first portion of the first sub-image associated with the first reference feature point to align with a portion of the second sub-image associated with the first matching candidate feature point; and
shifting, using the processing system, a second portion of the first sub-image associated with the second reference feature point to align with a portion of the second sub-image associated with the second matching candidate feature point.

18. A method, comprising:
accessing, using a processing system, a reference feature point in a first sub-image associated with a first section of a borehole, wherein the reference feature point is associated with a high contrast region in the first sub-image;
identifying, using the processing system, two or more candidate feature points in a second sub-image associated with a second section of the borehole adjacent to the first section of the borehole, wherein each of the two or more candidate feature points are possibly associated with the high contrast region;
pruning, using the processing system, the one or more candidate feature points using global solution pruning to arrive at a matching candidate feature point in the second sub-image; and
based on the arrived-at matching candidate feature point, aligning, using the processing system, the first sub-image and the second sub-image to create an image of the borehole.

19. The method of claim 18, further comprising:
pruning, using the processing system, the one or more candidate feature points by calculating a unique shift value between the reference feature point and each of the two or more candidate feature points; and
choosing, using the processing system, the matching candidate feature point based at least partially on a shift value associated with the matching candidate feature point.

20. The method of claim 18, further comprising:
shifting, using the processing system, a portion of the second sub-image associated with the matching candidate feature point in accordance with a shift value associated with the matching candidate feature point to align with a portion of the first sub-image associated with the reference feature point.

* * * * *